United States Patent
Ogasawara

(10) Patent No.: US 9,462,191 B2
(45) Date of Patent: Oct. 4, 2016

(54) IMAGE PROCESSING APPARATUS, IMAGE PICKUP APPARATUS, METHOD OF CONTROLLING THE IMAGE PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Tsutomu Ogasawara, Funabashi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/457,895

(22) Filed: Aug. 12, 2014

(65) Prior Publication Data
US 2015/0054987 A1    Feb. 26, 2015

(30) Foreign Application Priority Data
Aug. 21, 2013 (JP) ................. 2013-171459

(51) Int. Cl.
*H04N 5/235* (2006.01)

(52) U.S. Cl.
CPC .......... *H04N 5/2351* (2013.01); *H04N 5/2355* (2013.01)

(58) Field of Classification Search
None
See application file for complete search history.

(56) References Cited

U.S. PATENT DOCUMENTS

2012/0133797 A1* 5/2012 Sato ................. G03B 15/02
348/239

FOREIGN PATENT DOCUMENTS

JP         04-215633 A      8/1992

* cited by examiner

*Primary Examiner* — Mark Monk
(74) *Attorney, Agent, or Firm* — Cowan, Liebowitz & Latman, P.C.

(57) ABSTRACT

An image processing apparatus includes an acquiring unit configured to acquire an image signal, a generating unit configured to perform enhancement processing on the image signal to generate a first image and a second image, a synthesizing unit configured to generate a synthetic image with the first image used in a region having a first brightness and the second image used in a region having a second brightness lower than the first brightness, and a recording unit configured to record the synthetic image on a recording medium, the generating unit being configured to perform the enhancement processing such that the second image is more enhanced than the first image.

16 Claims, 10 Drawing Sheets

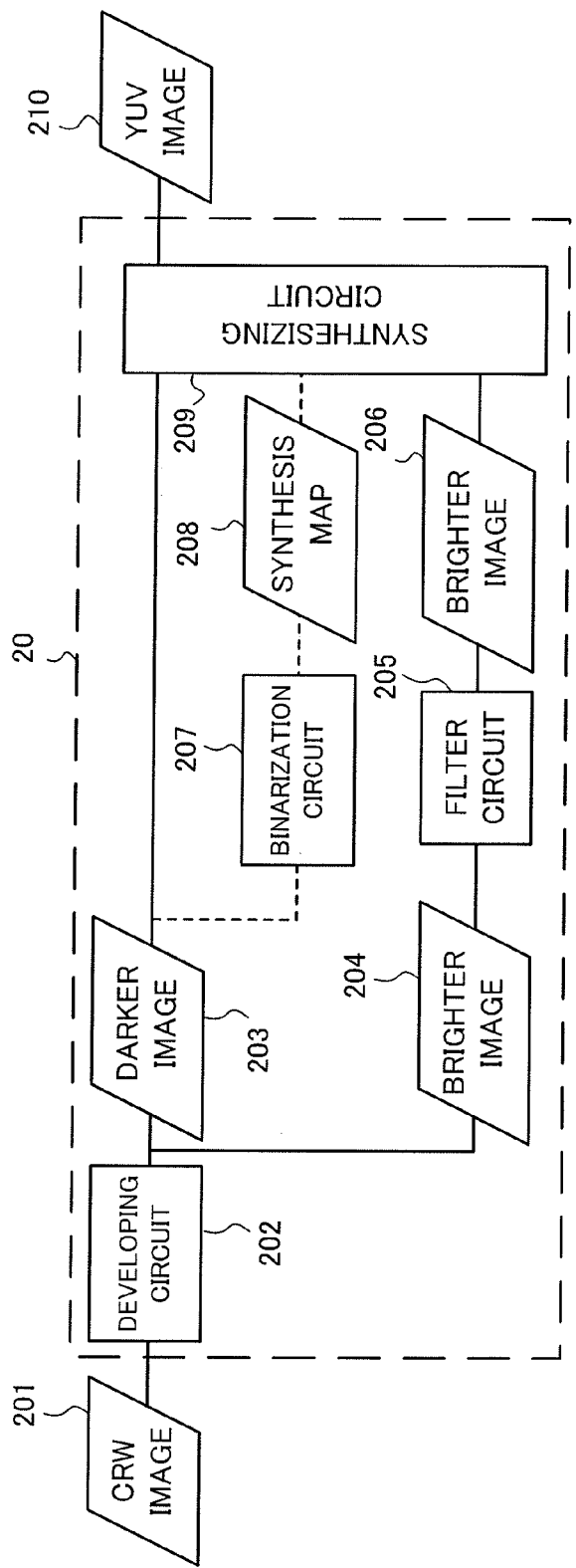
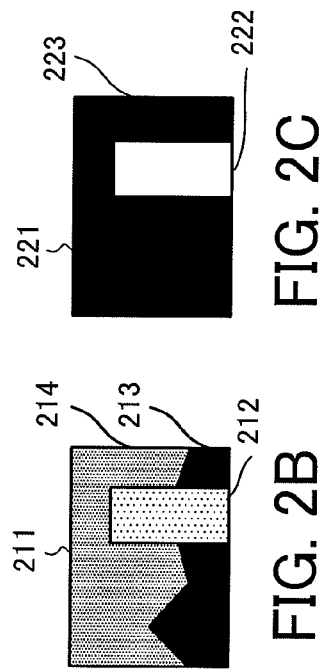
FIG. 2A
FIG. 2B
FIG. 2C

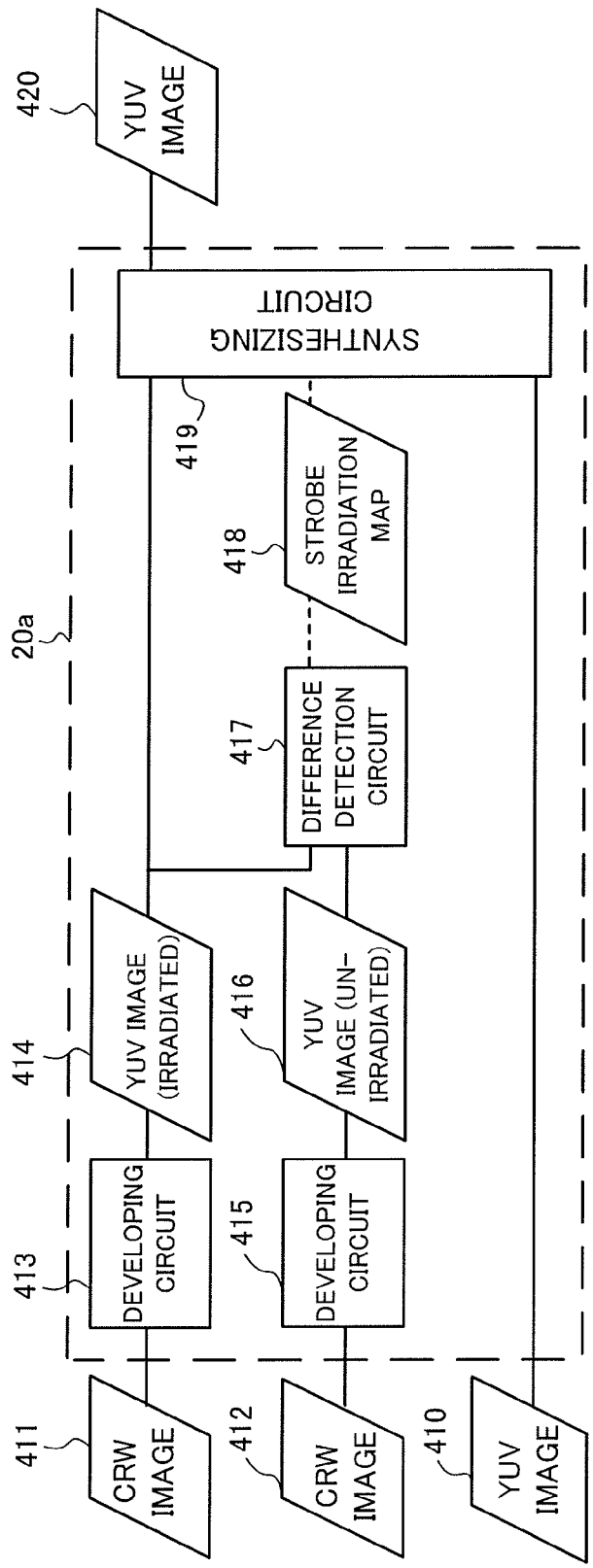
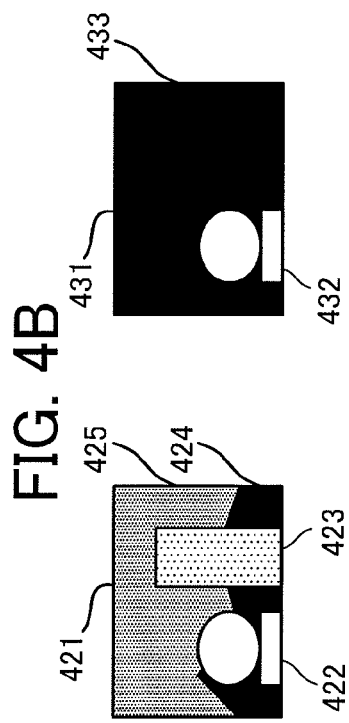
FIG. 4B
FIG. 4C
FIG. 4D

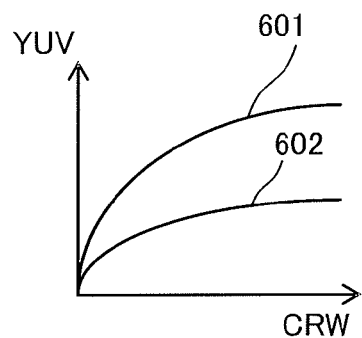
FIG. 6A
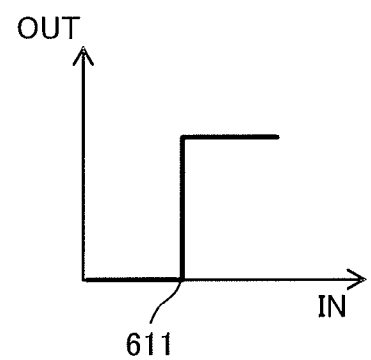
FIG. 6B
FIG. 6C
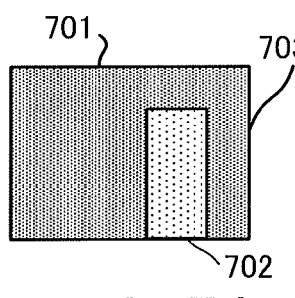
FIG. 7A
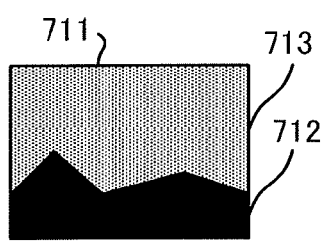
FIG. 7B
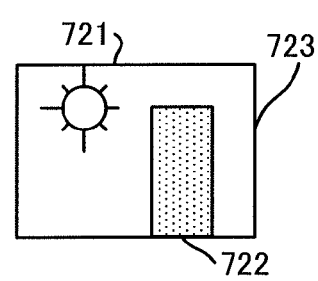
FIG. 7C

IMAGE PROCESSING APPARATUS, IMAGE PICKUP APPARATUS, METHOD OF CONTROLLING THE IMAGE PROCESSING APPARATUS, AND NON-TRANSITORY COMPUTER-READABLE STORAGE MEDIUM

BACKGROUND OF THE INVENTION

1. Field of the Invention

The present invention relates to an image pickup apparatus including an image pickup element.

2. Description of the Related Art

Recent digital cameras (image pickup apparatuses) allow low noise image capturing of a night scene or a starry sky by manually performing long-exposure image capturing without setting an image capturing mode to a night scene mode that involves increasing the sensitivity. Some digital cameras have an image capturing mode that allows image capturing with a strobe by irradiating a main object with strobe light to achieve an appropriate exposure therefor and bright image capturing of a background by long-exposure image capturing, as performed in slow synchronization. For example, Japanese Patent Laid-open No. H4-215633 discloses a multiple-exposure camera capable of performing multiple exposure by image capturing with strobe light and long-exposure image capturing.

However, in a particular shot scene involving, for example, image capturing mainly of a starry sky, the image capturing at a desired exposure for the starry sky potentially causes overexposure due to a too bright object such as a building included in a shot image. In addition, enhancement of stars after image capturing potentially causes too much enhancement of the edge of the object such as a building included in the shot image. Furthermore, setting an exposure appropriate for the starry sky at image capturing by slow synchronization potentially results in too bright image capturing, which is overexposure, of a main object depending on its way of being irradiated with external light. Since an object included in a shot image of image capturing mainly of the starry sky differs between shot scenes such as city and countryside, image processing appropriate for the shot scene is preferably performed with taken into consideration the starry sky and other objects included in the shot image.

SUMMARY OF THE INVENTION

The present invention provides an image processing apparatus, an image pickup apparatus, a method of controlling the image processing apparatus, and a non-transitory computer-readable storage medium that are capable of acquiring a desired image even for a scene including a plurality of objects having different brightnesses.

An image processing apparatus as one aspect of the present invention includes an acquiring unit configured to acquire an image signal, a generating unit configured to perform enhancement processing on the image signal to generate a first image and a second image, a synthesizing unit configured to generate a synthetic image with the first image used in a region having a first brightness and the second image used in a region having a second brightness lower than the first brightness, and a recording unit configured to record the synthetic image on a recording medium, the generating unit being configured to perform the enhancement processing such that the second image is more enhanced than the first image.

An image pickup apparatus as another aspect of the present invention includes an image pickup element configured to photoelectrically convert an optical image and output an image signal, an acquiring unit configured to acquire the image signal, a generating unit configured to perform enhancement processing on the image signal to generate a first image and a second image, a synthesizing unit configured to generate a synthetic image with the first image used in a region having a first brightness and the second image used in a region having a second brightness lower than the first brightness, and a recording unit configured to record the synthetic image on a recording medium, the generating unit being configured to perform the enhancement processing such that the second image is more enhanced than the first image.

A method of controlling an image processing apparatus as another aspect of the present invention includes the steps of acquiring an image signal, performing enhancement processing on the image signal to generate a first image and a second image, generating a synthetic image with the first image used in a region having a first brightness and the second image used in a region having a second brightness lower than the first brightness, and recording the synthetic image, the enhancement processing being configured to perform such that the second image is more enhanced than the first image.

A non-transitory computer-readable storage medium as another aspect of the present invention is a non-transitory computer-readable storage medium that stores a program configured to cause a computer to execute a process, the process including, acquiring an image signal, performing enhancement processing on the image signal to generate a first image and a second image, generating a synthetic image with the first image used in a region having a first brightness and the second image used in a region having a second brightness lower than the first brightness, and recording the synthetic image, the enhancement processing being configured to perform such that the second image is more enhanced than the first image.

Further features and aspects of the present invention will become apparent from the following description of exemplary embodiments with reference to the attached drawings.

BRIEF DESCRIPTION OF THE DRAWINGS

FIGS. 2A to 2C are block diagrams of the configuration of an image processing circuit in first and third embodiments.

FIGS. 4A to 4D are block diagrams of the configuration of an image processing circuit and explanatory diagrams of the image processing circuit in second and fourth embodiments.

FIGS. 6A to 6C are explanatory diagrams of the image processing circuit in the first embodiment.

FIGS. 7A to 7C are explanatory diagrams of shot scenes assumed in the third and the fourth embodiments.

DESCRIPTION OF THE EMBODIMENTS

Exemplary embodiments of the present invention will be described below with reference to the accompanied drawings.

Figure 1:
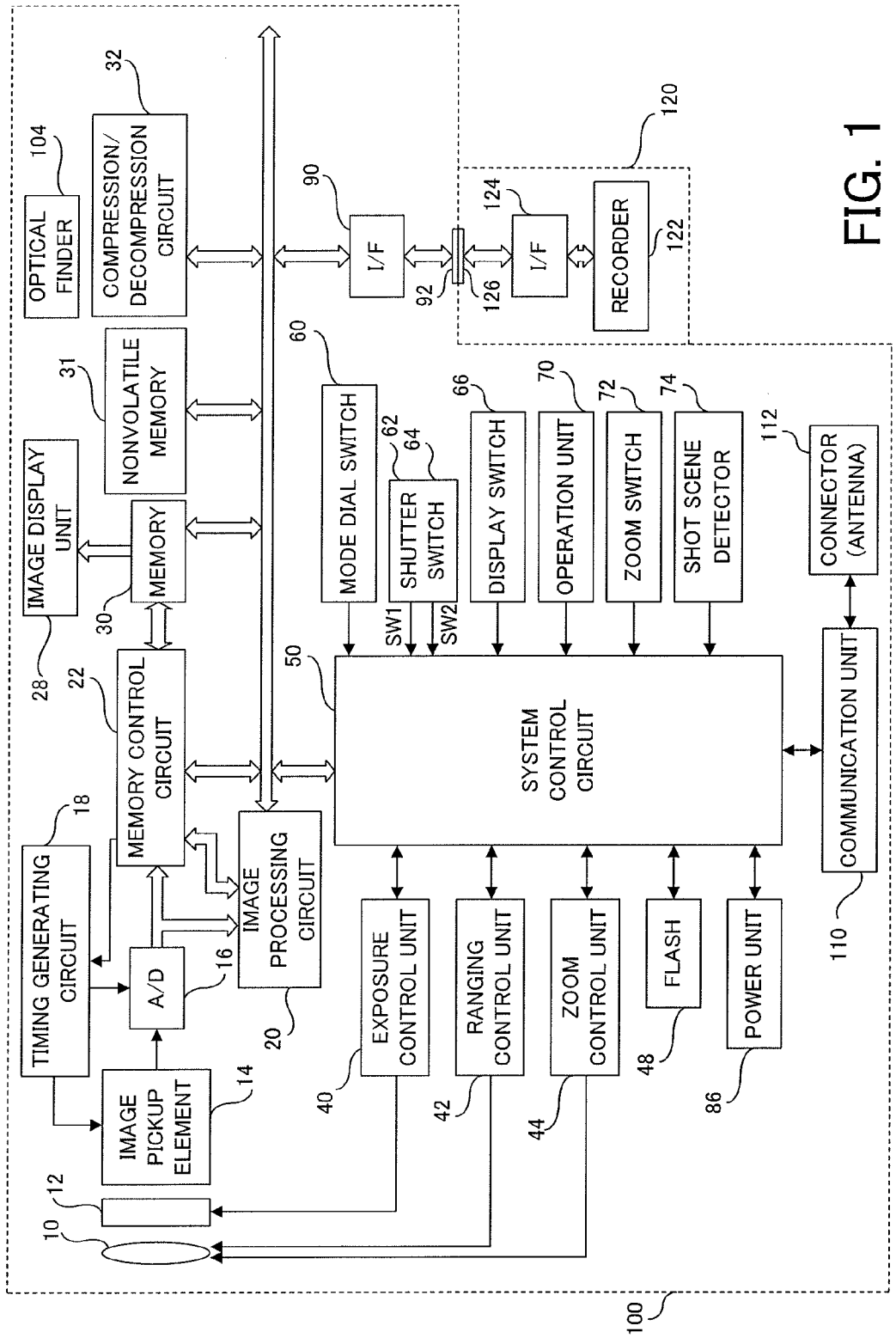
FIG. 1 is a block diagram of the configuration of an image pickup apparatus in each of embodiments.

First, referring to FIG. 1, the configuration of an image pickup apparatus (digital camera) in an embodiment of the present invention will be described. FIG. 1 is a block diagram of the configuration of the image pickup apparatus in the present embodiment.

In an image pickup apparatus 100, reference numeral 10 denotes an image pickup lens (image pickup optical system), reference numeral 12 denotes a mechanical shutter having a function of an aperture stop, and reference numeral 14 denotes an image pickup element configured to photoelectrically convert an object image (optical image) and output an electric signal (analog signal) as an image signal. Reference numeral 16 denotes an A/D converter configured to convert the analog signal output from the image pickup element 14 into a digital signal. Reference numeral 18 denotes a timing generating circuit that is configured to supply the image pickup element 14 and the A/D converter 16 with a clock signal and a control signal and is controlled by a memory control circuit 22 and a system control circuit 50. In the present embodiment, the mechanical shutter 12 may be replaced with an electronic shutter configured to control a reset timing of the image pickup element 14 to control an accumulation time, which is applicable to moving image capturing and the like.

Reference numeral 20 denotes an image processing circuit that performs predetermined pixel interpolation processing, color conversion processing, noise removal processing, edge enhancement processing, and the like on data from the A/D converter 16 or data from the memory control circuit 22. The image processing circuit 20 also performs wavelet transform processing for face detection on image data from the memory control circuit 22. In addition, the image processing circuit 20 performs predetermined calculation processing with a shot image (image data) in order to perform TTL automatic white balance (AWB) processing. Then, the image processing circuit 20 calculates an obtained calculation result as a white balance (WB) evaluation value and performs a color conversion on the image data based on the WB evaluation value thus calculated. Furthermore, in order to calculate an AF evaluation value, an AE evaluation value, and an EF evaluation value for performing TTL AF processing, TTL AE processing, and TTL EF processing, respectively, the image processing circuit 20 performs predetermined calculation processing with the shot image (image data). Based on the AF evaluation value, the AE evaluation value, and the EF evaluation value obtained from the image processing circuit 20, the system control circuit 50 controls an exposure control unit 40 and a ranging control unit 42 according to a predetermined algorithm.

As described later, the image processing circuit 20 includes a developing circuit 202, a filter circuit 205, a binarization circuit 207, and a synthesizing circuit 209. Each of these circuits is controlled by the system control circuit 50. The system control circuit 50 preferably operates the developing circuit 202, the filter circuit 205, the binarization circuit 207, and the synthesizing circuit 209, when it is determined that a shot scene is a night scene. The system control circuit 50 also preferably operates the developing circuit 202, the filter circuit 205, the binarization circuit 207, and the synthesizing circuit 209, when an image capturing mode (shooting mode) is set to a night scene mode.

Reference numeral 22 denotes a memory control circuit that controls the A/D converter 16, the timing generating circuit 18, the image processing circuit 20, a memory 30 (storage unit), and a compression/decompression circuit 32. Data (the image signal) output from the A/D converter 16 is stored into the memory 30 via the image processing circuit 20 and the memory control circuit 22, or directly via the memory control circuit 22.

Reference numeral 28 denotes an image display unit including a TFT-LCD. The image data for display written onto the memory 30 is displayed on the image display unit 28 (display unit) via the memory control circuit 22. The image display unit 28 can be used to successively display the shot image (image data), thereby achieving a function of an electronic finder. The image display unit 28 is capable of optionally turning on and off the display based on an instruction (command) from the system control circuit 50. When turned off, the image display unit 28 contributes to a reduced electrical power consumption of the image pickup apparatus 100 (image processing apparatus).

Reference numeral 30 denotes a memory that stores a shot still image and a shot moving image and has a storage capacity sufficient to store a predetermined number of still images and a moving image of a predetermined length. This sufficient capacity allows a fast writing of a large amount of images onto the memory 30 when performing continuous image capturing or panorama image capturing which involves successive capturing of a plurality of still images. The memory 30 is also usable as a working space for the system control circuit 50.

Reference numeral 31 denotes a nonvolatile memory including an EEPROM (flash memory) for example. A program (program code) to be executed by the system control circuit 50 is written onto the nonvolatile memory 31. The system control circuit 50 implements a function of the image pickup apparatus 100 by successively reading out the program stored in the nonvolatile memory 31. The nonvolatile memory 31 is provided with a region for storing system information, a region for storing user setting information, and other regions. Such a configuration allows various kinds of information and settings to be read out and restored at a next activation.

The compression/decompression circuit 32 compresses and decompresses the image data by an adaptive discrete cosine transform (ADCT) or the like. The compression/decompression circuit 32 reads out an image stored in the memory 30, performs compression processing or decompression processing, and writes data to which the processing is applied, onto the memory 30. The exposure control unit 40 controls the mechanical shutter 12 having the function of an aperture stop. The exposure control unit 40 has a function of modulating a flash light cooperatively with a flash 48. The ranging control unit 42 controls focusing of the image pickup lens 10. Reference numeral 44 denotes a zoom control unit that controls zooming of the image pickup lens 10. Reference numeral 48 denotes a flash (a strobe or a light emitting unit) that has an AF auxiliary light projecting function and a flash light modulating function. The exposure control unit 40 and the ranging control unit 42 are controlled by a TTL method. The system control circuit (control unit) 50 controls the entire image pickup apparatus 100 (image processing apparatus). The system control circuit 50 controls the exposure control unit 40 and the ranging control unit 42 based on the calculation result of the shot image (image data) by the image processing circuit 20.

Reference numerals 60, 62, 64, 66, 70, and 72 denote operation units through which various operation instructions of the system control circuit 50 are input. These operation units include one or more of a switch, a dial, a touch panel, an apparatus for pointing by line-of-sight detection, a voice recognition apparatus, and the like. These operation units will be described specifically below.

The operation unit 60 is a mode dial switch. The mode dial switch 60 allows switching between function modes such as a power-off, a still image capturing mode, a panorama image capturing mode, a moving image capturing mode, a snap movie capturing mode, a playback mode, a multiscreen playback, a PC connection mode, and a TV program receiving mode. In addition, the mode dial switch 60 allows setting of the image capturing mode such as the night scene mode. The operation unit 62 is a first shutter switch (SW1). The first shutter switch 62 is turned on while a shutter button is being operated, and instructs start of image-capturing preparation operations such as AF (autofocus) processing, AE (automatic exposure) processing, and AWB (automatic white balance) processing.

The operation unit 64 is a second shutter switch (SW2). The second shutter switch 64 is turned on when the operation of the shutter button is completed, and instructs start of a series of processing. This series of processing starts with image read-in processing of writing a signal (the image data) read out from the image pickup element 14 onto the memory 30 via the A/D converter 16 and the memory control circuit 22. In addition, development processing involving calculations at the image processing circuit 20 and the memory control circuit 22, and processing of reading out of the image data from the memory 30 followed by compression processing at the compression/decompression circuit 32 are performed. Then, recording processing of writing the image data onto a recording medium 120 is performed.

The operation unit 66 is a display switch and allows switching of display of the image display unit 28. This switching function allows power saving to be achieved by cutting current supply to the image display unit 28 including a TFT-LCD when image capturing is performed with an optical finder 104. The operation unit 70 is an operation unit including various kinds of buttons and a touch panel. The operation unit 70 includes a menu button, a set button, a macro button, a multiscreen-playback page feed button, a flash setting button, and a button for switching between single image capturing, continuous image capturing, and self-timer image capturing. The operation unit 70 also includes a menu shift forward button, a menu shift backward button, a playback image shift forward button, a playback image shift backward button, an image capturing quality selection button, an exposure correction button, and a date/time setting button.

The operation unit 72 is a zoom switch as a zoom operation unit through which a user instructs to change magnification of an image to be captured. The zoom switch 72 includes a tele-switch to change an image-pickup angle of view to that on a telephoto side and a wide-switch to change the image-pickup angle of view to that on a wide-angle side. An operation of the zoom switch 72 triggers an instruction to the zoom control unit 44 to change the image-pickup angle of view of the image pickup lens 10, thereby performing an optical zoom operation. The operation of the zoom switch 72 also triggers trimming of an image by the image processing circuit 20 and an electronic change of the image-pickup angle of view through pixel interpolation processing and the like.

Reference numeral 74 denotes a shot scene detector (shot scene detecting unit). The shot scene detector 74 detects (determines) the shot scene such as a night scene or a daytime. Reference numeral 86 denotes a power unit including a primary battery such as an alkaline battery or a lithium battery, or a secondary battery such as a NiCd battery, a NiMH battery, or a Li battery, and an AC adapter. Reference numeral 90 denotes an interface (I/F) to a recording medium such as a memory card or a hard disk. Reference numeral 92 denotes a connector for connection with the recording medium such as a memory card or a hard disk. The present embodiment describes the configuration including a single system of the interface and the connector to which the recording medium is attached, but the present invention is not limited to this configuration. The configuration may include a plurality of systems of the interface and the connector to which the recording medium is attached.

Reference numeral 104 denotes an optical finder. The image pickup apparatus 100 is capable of performing image capturing with the optical finder 104 only, without the electronic finder functionality of the image display unit 28. Reference numeral 110 denotes a communication unit. The communication unit 110 has various communication functions through USB, IEEE1394, LAN, wireless communication, and the like. Reference numeral 112 denotes a connector allowing the communication unit 110 to connect the image pickup apparatus 100 (image processing apparatus) with other devices or denotes an antenna for wireless communication. The recording medium 120 is a memory card, a hard disk, or the like. The recording medium 120 includes a recorder 122 including a semiconductor memory or a magnetic disk, an interface 124 (I/F) to the image pickup apparatus 100, and a connector 126 for connection with the image pickup apparatus 100.

The image pickup apparatus 100 in the present embodiment is integrated with the image pickup lens 10, but is not limited to this configuration. The present embodiment is also applicable to an image pickup system including an image pickup apparatus body and an image pickup lens (image pickup optical system) detachable from the image pickup apparatus body.

First Embodiment

Next, referring to FIGS. 2A to 2C, the configuration of the image processing circuit 20 in a first embodiment will be described. FIG. 2A is a block diagram of the configuration of the image processing circuit 20. The A/D converter 16 performs an A/D conversion on an image pickup signal (image signal) from the image pickup element 14 and generates a CRW image 201 expressed in an RGB Bayer array. The CRW image 201 is input to the developing circuit 202 (acquiring unit) of the image processing circuit 20.

The developing circuit 202 (a generating unit, a developing unit) performs demosaicing processing on the CRW image 201, then converts the image into a luminance signal (Y signal) and a color difference signal (UV signal), and generates a YUV image on which image processing such as edge enhancement, white balance, and gamma conversion is performed. During the image processing, the developing circuit 202 performs the gamma conversion twice with different gamma curves, thereby obtaining two images of a darker image 203 (first image) and a brighter image 204 (second image). In other words, the developing circuit 202 (generating unit) performs the processing on the image signal from the image pickup element 14 with parameters different from each other, thereby generating the first image and the second image. The parameters are set such that the second image is brighter than the first image. Therefore, the brighter image 204 (second image) is brighter than the darker image 203 (first image). The developing circuit 202 preferably changes the gamma curve as a parameter, thereby generating the brighter image 204 having a higher luminance than those of the darker image 203 and the darker image 203. In the present embodiment, the first image and the second image are generated from one shot image, but are not limited thereto. For example, the first image and the second image may be generated from a plurality of shot images captured with exposures different from each other.

In the present embodiment, the developing circuit 202 (generating unit) generates the first image and the second image brighter than the first image with different gamma curves used as parameters different from each other. However, the present embodiment is not limited to this configuration. For example, the developing circuit 202 may be configured to generate the first image and the second image brighter than the first image with different digital gains used as parameters different from each other.

The filter circuit 205 (filtering processing unit) performs filtering processing involving edge enhancement on the brighter image 204 (the second image), thereby generating a brighter image 206 on which the filtering processing is performed. In the present embodiment, the filter circuit 205 is configured to perform the edge enhancement as the filtering processing on an image developed by the developing circuit 202, but is not limited to this configuration and the filtering processing includes low-pass filtering processing that unsharps a low frequency component. For example, the filter circuit 205 as the filtering processing unit may be included in the developing circuit 202 (generating unit). In this case, the brighter image (second image) generated by the developing circuit 202 is a brighter image on which the filtering processing is performed. That is, the developing circuit (including the filter circuit) performs both development and edge enhancement.

The binarization circuit 207 (region setting unit) binarizes the darker image 203 based on a predetermined luminance as a threshold and generates a synthesis map 208 for synthesis at a later stage. In other words, the binarization circuit 207 sets a first region and a second region by using the darker image 203. The binarization circuit 207 preferably sets a region having a luminance higher than a first luminance in the darker image 203 as the first region (higher luminance region). The binarization circuit 207 also preferably sets a region having a luminance lower than a second luminance in the darker image 203 as the second region (lower luminance region).

The synthesizing circuit 209 (synthesizing unit) synthesizes the darker image 203 and the edge-enhanced brighter image 206 based on the synthesis map 208 and generates to output a YUV image 210 as a synthetic image. In this manner, the synthesizing circuit 209 allocates the darker image 203 (first image) to the first region and the edge-enhanced brighter image 206 (edge-enhanced second image) to the second region, thereby generating the synthetic image (output image). In other words, the synthesizing circuit 209 synthesizes the first image and the second image based on the brightness of the first image, thereby generating the synthetic image.

FIG. 2B is an exemplary image capturing composition. In FIG. 2B, reference numeral 211 denotes an assumed night scene. Reference numeral 212 denotes a bright object such as a building, reference numeral 213 denotes a dark object such as a mountain, and reference numeral 214 denotes a night sky. FIG. 2C illustrates a result of binarization of the night scene 211 by the binarization circuit 207. In FIG. 2C, reference numeral 221 denotes the synthesis map generated by the binarization circuit 207. Reference numeral 222 denotes a region (the first region) whose luminance is determined to be higher than a first threshold (predetermined threshold) in the binarization. Reference numeral 223 denotes a region (the second region) whose luminance is determined to be lower than a second threshold (predetermined threshold) in the binarization. In the present embodiment, the first threshold and the second threshold are set to be the same in the binarization, but may be set different from each other so that the image is separated into regions based on multiple values. In this case, development may be performed at the same number of brightnesses (curves) as the number of the separated regions, and images thus developed in the brightnesses of three or more may be used predominantly in the respective regions of the synthesis map separated based on the brightnesses, thereby generating the synthetic image.

The synthesizing circuit 209 performs an image synthesis by allocating the darker image 203 to the higher luminance region 222 and the edge-enhanced brighter image 206 to the lower luminance region 223 based on the synthesis map 221 (208).

Subsequently, referring to FIGS. 6A to 6C, the function of the image processing circuit 20 in the present embodiment will be described in detail. FIG. 6A illustrates exemplary gamma curves illustrating a relation between an input YUV image (input image) to and an output YUV image (output image) from a circuit that is disposed in the developing circuit 202 and performs a gamma conversion. In FIG. 6A, the horizontal axis and the vertical axis respectively represent the input and output YUV images. FIG. 6A illustrates, as exemplary gamma curves, a gamma curve 601 for a brighter development and a gamma curve 602 for a darker development. In the description of the present embodiment, the darker image and the brighter image are generated with the use of gamma curves different from each other, but not limited thereto. The darker image and the brighter image may be generated through multiplication by a linear gain irrespective of the luminance.

FIG. 6B illustrates an example of the filtering processing unit in the present embodiment. Although FIG. 6B illustrates an edge enhancement filter (the filter circuit 205) of 3×3 pixels, the filtering processing unit is not limited to this configuration.

FIG. 6C illustrates an exemplary binarization in the present embodiment. In FIG. 6C, the horizontal axis represents an input luminance level (IN), and the vertical axis represents an output luminance level (OUT). The binarization circuit 207 outputs 0 when the input luminance level is lower than a predetermined threshold 611. On the other hand, the binarization circuit 207 outputs 1 when the input luminance level is higher than the predetermined threshold 611. In the description of the present embodiment, the synthesis map 208 (221) is a binarized map, but is not limited thereto and may be a synthesis map having graduated multiple values.

Figure 3:
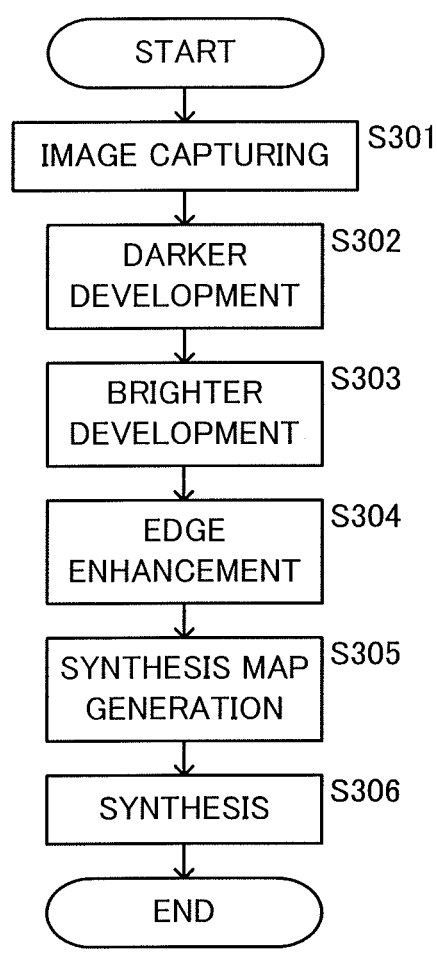
FIG. 3 is a flowchart of the operation of the image pickup apparatus in the first embodiment.

Subsequently, referring to FIG. 3, the operation of the image pickup apparatus 100 in the present embodiment will be described. FIG. 3 is a flowchart of the operation of the image pickup apparatus 100. Each step in FIG. 3 is performed by the image processing circuit 20 mainly based on a command (instruction) from the system control circuit 50.

First at step S301, when the user turns on the second shutter switch 64 (SW2), an image capturing operation starts and the image processing circuit 20 acquires the CRW image 201. Subsequently at step S302, the developing circuit 202 generates the darker image 203 by developing the CRW image 201 darker based on the gamma curve 602. Then, at step S303, the developing circuit 202 generates the brighter image 204 by developing the CRW image 201 brighter based on the gamma curve 601.

Subsequently at step S304, the filter circuit 205 generates the brighter image 206 by performing an edge enhancement on the brighter image 204. At step S305, the binarization circuit 207 generates the synthesis map 208 by binarizing the darker image 203 based on the threshold 611. Then, at step S306, the synthesizing circuit 209 synthesizes the darker image 203 and the edge-enhanced brighter image 206 based on the synthesis map 208 (221). Specifically, the synthesis is performed with the darker image 203 used predominantly in a region having a value of 1 and the brighter image 206 used predominantly in a region having a value of 0 in the synthesis map 208 (221). A synthesis ratio at a border between the regions having 0 and 1 in the synthesis map 208 (221) may be gradually changed to make the border less apparent. In the synthesis, the synthesizing circuit 209 generates the synthetic image with the first image used predominantly in a region in the first image having a signal level higher than a first level and the second image used predominantly in a region having a signal level lower than the first level.

As described above, in the present embodiment, the synthetic image is generated by developing a shot image into images having a plurality of brightnesses and using each of the images predominantly in a region whose brightness corresponds to the image, thereby acquiring a desired image even for a scene including a plurality of objects having different brightnesses. In addition, the use of a brighter developed and edge-enhanced image in a darker region in the angle of view assuming a starry sky can obtain the synthetic image with the brightnesses of stars enhanced. Furthermore, for a shot scene such as a countryside night scene having a low illumination intensity, stars are enhanced in an image of the scene by setting an exposure appropriate for a sky with the stars, whereas degradation due to the star enhancement can be less apparent because low-contrast objects such as a mountain and trees included in the same image are unlikely to be edge-enhanced.

Second Embodiment

Referring to FIGS. 4A to 4D, the configuration of an image processing circuit 20a in a second embodiment will be described. The present embodiment uses a stroboscopically-illuminated image to generate an image showing a closer object such as a person at an appropriate brightness and also a starry sky at an appropriate brightness.

Figure 4A:
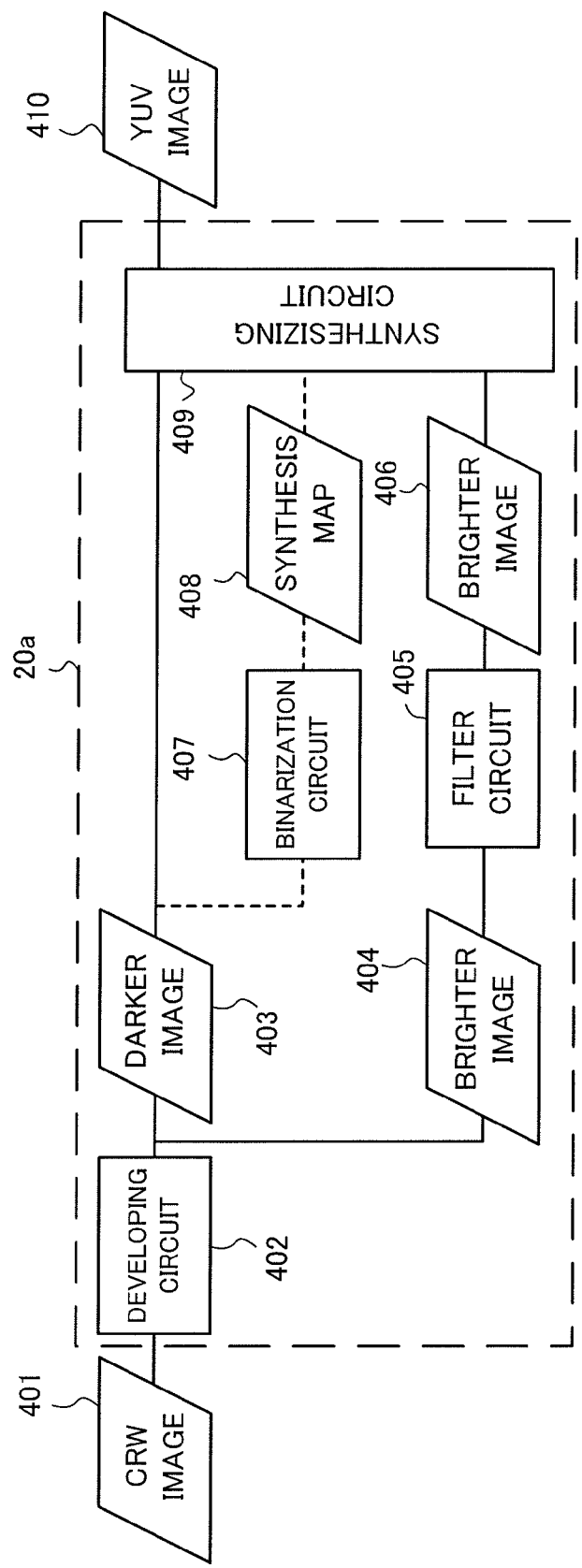

FIGS. 4A and 4B are block diagrams of the configuration of the image processing circuit 20a. FIG. 4A illustrates part of the image processing circuit 20a that generates a background image, and FIG. 4B illustrates the entire image processing circuit 20a.

In the present embodiment, the background image is generated by the configuration illustrated in FIG. 4A. Reference numerals 401 to 410 in FIG. 4A respectively correspond to reference numerals 201 to 210 in FIG. 2A in the first embodiment, and thus a description thereof will be omitted.

In FIG. 4B, the image processing circuit 20a acquires an image (CRW image 411) captured by flashing the strobe (light emitting unit such as the flash 48). The image processing circuit 20a also acquires an image (CRW image 412) captured without flashing the strobe. The CRW image 411 acquired by flashing the strobe is output to a developing circuit 413 (a generating unit, a developing unit). The developing circuit 413 develops the CRW image 411 and generates a YUV image 414 (third image). The image (CRW image 412) captured without flashing the strobe is output to a developing circuit 415 (a generating unit, a developing unit). The developing circuit 415 develops the CRW image 412 and generates a YUV image 416 (fourth image). In this manner, the developing circuits 413 and 415 respectively generates the third image captured by flashing the strobe (flash 48) and the fourth image captured without flashing the strobe.

A difference detection circuit 417 (region setting unit) detects the difference between the two images of the YUV image 414 (YUV image obtained by flashing the strobe) and the YUV image 416 (YUV image obtained without flashing the strobe) and generates a strobe irradiation map 418. In other words, the difference detection circuit 417 sets a third region (strobe irradiated region) and a fourth region (strobe unirradiated region) based on the difference between the third image and the fourth image. For example, the difference detection circuit 417 sets the third region to be a region where the difference between the third image and the fourth image is larger than a predetermined threshold.

A synthesizing circuit 419 (synthesizing unit) synthesizes the YUV image 414 (strobe irradiated image) and a YUV image 410 (background image generated as illustrated in FIG. 4A) based on the strobe irradiation map 418 (a synthesis map) to generate a YUV image 420 (second synthetic image). Specifically, the synthesizing circuit 419 generates a second synthetic image by allocating the third image to the third region and the YUV image 410 (a synthetic image generated from the first image and the second image) to the fourth region.

FIG. 4C illustrates an exemplary image capturing composition. In FIG. 4C, reference numeral 421 denotes an assumed night scene. Reference numeral 422 denotes a main object such as a person positioned at a distance that light from the strobe can reach, reference numeral 423 denotes a bright object such as a building, reference numeral 424 denotes a dark object such as a mountain, and reference numeral 425 denotes a night sky. FIG. 4D illustrates a result of the difference detection for the night scene 421 by the difference detection circuit 417. In FIG. 4D, reference numeral 431 denotes a strobe irradiation map (the strobe irradiation map 418) generated by the difference detection circuit 417, reference numeral 432 denotes a region irradiated with light from the strobe, and reference numeral 433 denotes a region not irradiated with light from the strobe.

The synthesizing circuit 419 allocates the YUV image 414 (image obtained by flashing the strobe) to the region 432 irradiated with light from the strobe based on the strobe irradiation map 431 (synthesis map). The synthesizing circuit 419 also allocates the YUV image 410 (background image) to the region 433 not irradiated with light from the strobe. In this manner, the synthesizing circuit 419 respectively allocates the YUV images 414 and 410 to the regions 432 and 433 to synthesize an image. In the description of the present embodiment, a developing circuit 402 and the developing circuits 413 and 415 are circuits different from each other, but may be the same developing circuit. Similarly, a synthesizing circuit 409 and the synthesizing circuit 419 may be the same synthesizing circuit. In addition, a binarization circuit 407 and the difference detection circuit 417 can be configured as the same region setting unit, but may be configured as region setting units (a first region setting unit and a second region setting unit) different from each other.

Figures 5A, 5B:
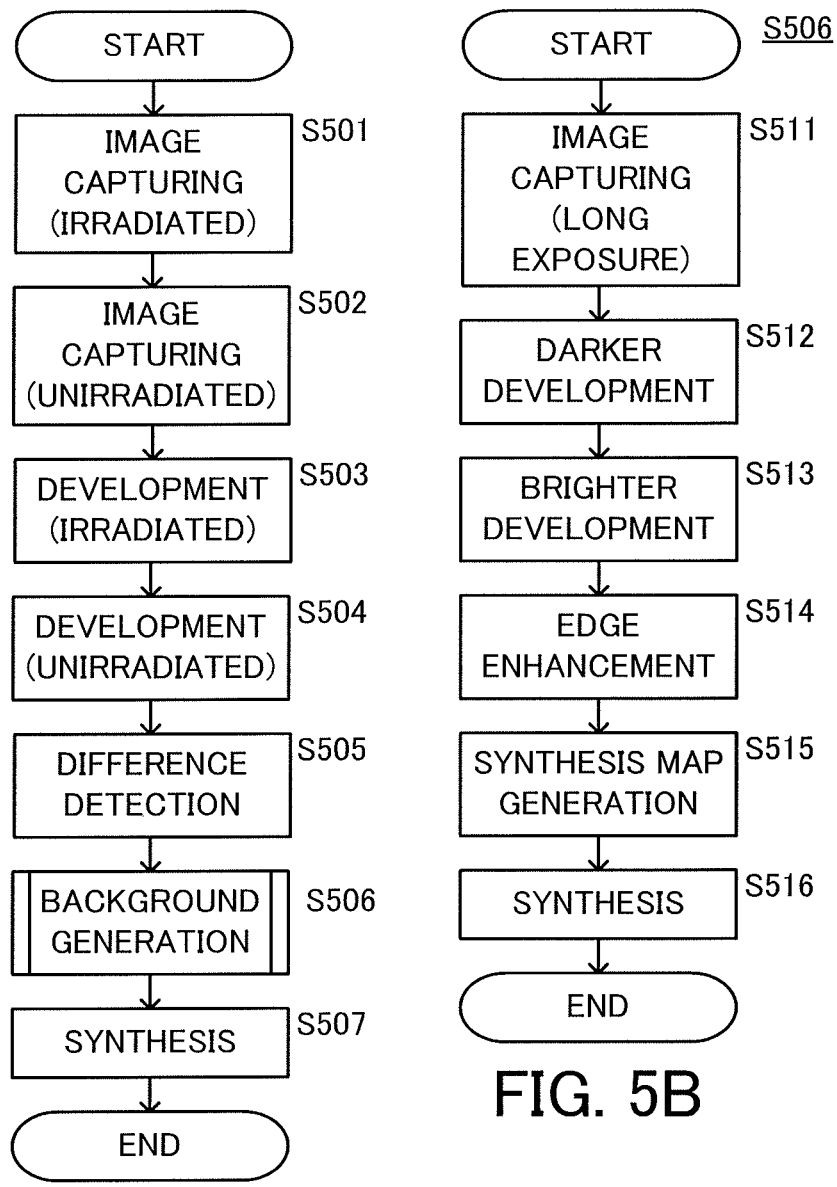
FIGS. 5A and 5B are flowcharts of the operation of an image pickup apparatus in the second embodiment.

Subsequently, referring to FIGS. 5A and 5B, the operation of the image pickup apparatus 100 in the present embodiment will be described. FIGS. 5A and 5B are flowcharts of the operation of the image pickup apparatus 100. Each step in FIGS. 5A and 5B is performed by the image processing circuit 20a mainly based on a command (instruction) from the system control circuit 50.

First at step S501, when the user operates the second shutter switch 64 (SW2) (SW2 is turned on), an image capturing operation starts and the image processing circuit 20a acquires an image (the CRW image 411) captured by flashing the strobe. Then, at step S502, the image processing circuit 20a acquires an image (the CRW image 412) captured without flashing the strobe.

Subsequently at step S503, the developing circuit 413 generates the YUV image 414 by developing the CRW image 411 (image captured by flashing the strobe). Then, at step S504, the developing circuit 415 generates the YUV image 416 by developing the CRW image 412 (image captured without flashing the strobe). Subsequently at step S505, the difference detection circuit 417 detects the difference between the YUV image 414 generated at step S503 and the YUV image 416 generated at step S504 and generates the strobe irradiation map 418.

Subsequently at step S506, the image processing circuit 20a generates the background image (YUV image 410) based on another captured image. The details of step S506 will be described later. Then, at step S507, the synthesizing circuit 419 synthesizes the YUV image 414 (image obtained by flashing the strobe) and the YUV image 410 (background image) based on the strobe irradiation map 418 generated at step S505.

Next, referring to FIG. 5B, the generation of the background image (step S506) will be described in detail. FIG. 5B is a flowchart of the generation of the background image (step S506). First at step S511, the image processing circuit 20a acquires a CRW image 401 by (long-exposure) image capturing. Subsequently at step S512, the developing circuit 402 generates a darker image 403 by developing the CRW image 401 darker. Then, at step S513, the developing circuit 402 generates a brighter image 404 by developing the CRW image 401 brighter.

Subsequently at step S514, a filter circuit 405 generates a brighter image 406 by performing an edge enhancement on the brighter image 404. At step S515, the binarization circuit 407 generates a synthesis map 408 by binarizing the darker image 403 based on a certain luminance value as a threshold. Then, at step S516, the synthesizing circuit 409 synthesizes the darker image 403 and the edge-enhanced brighter image 406 based on the synthesis map 408.

In the description of the present embodiment, the irradiated image, the unirradiated image, and the background image are captured in this order, but are not limited to this order and may be captured in an optional order. In addition, in the description of the present embodiment, the image capturing and development of the irradiated and unirradiated images, and the image capturing, development, and synthesis of the background image are processed in this order, but are not limited to this order and may processed in an optional order. Furthermore, in the description of the present embodiment, the image capturing is performed three times, but is not limited thereto.

As described above, the generating unit (developing circuits 402, 413, and 415) generates the third image captured while the light emitting unit (flash 48), which irradiates an object with light, is emitting light, and generates the fourth image captured while the light emitting unit is not emitting light. Then, the synthesizing unit (difference detection circuit 417) generates the second synthetic image by synthesizing the third image and the synthetic image based on the difference between the third image and the fourth image. The synthesizing unit preferably generates the second synthetic image with the third image used predominantly in a region where the difference between the third image and the fourth image is larger than the predetermined threshold, and with the synthetic image used predominantly in a region where the difference is smaller than the predetermined threshold.

As described above, in the present embodiment, the synthetic image is generated by developing a shot image into images having a plurality of brightnesses and using each of the images predominantly in a region whose brightness corresponds to the image, thereby acquiring a desired image even for a scene including a plurality of objects having different brightnesses. In addition, the use of a brighter developed and edge-enhanced image in a darker region in the angle of view assuming a starry sky can obtain the synthetic image with the brightnesses of stars emphasized.

Furthermore, a bright object such as a building can be adequately edge-enhanced by replacing a higher luminance region with an adequately edge-enhanced image as well as enhancing the stars. The synthetic image having appropriate exposures for the main object and the background can be generated by synthesizing a stroboscopically-illuminated image capturing the main object and the background image obtained without flashing the strobe, based on the brightnesses of the main object and the background.

Third Embodiment

Next, an image processing circuit in a third embodiment will be described. The general configuration of the image processing circuit in the present embodiment is the same as that of the image processing circuit 20 in the first embodiment described referring to FIGS. 2A to 2C and FIGS. 6A to 6C, and thus a description thereof will be omitted.

Referring to FIGS. 7A to 7C, a shot scene assumed in the present embodiment (and a fourth embodiment described later) will be described. FIG. 7A illustrates a city night scene 701 including a building 702 as a bright object and a starry sky 703. FIG. 7B illustrates a countryside night scene 711 including objects 712 such as a mountain and trees and a starry sky 713. FIG. 7C illustrates a daytime scene 721 including a building 722 and a sky 723. The city night scene 701 illustrates the bright object (building 702) only, but is not limited thereto and may include a dark object.

Figure 8:
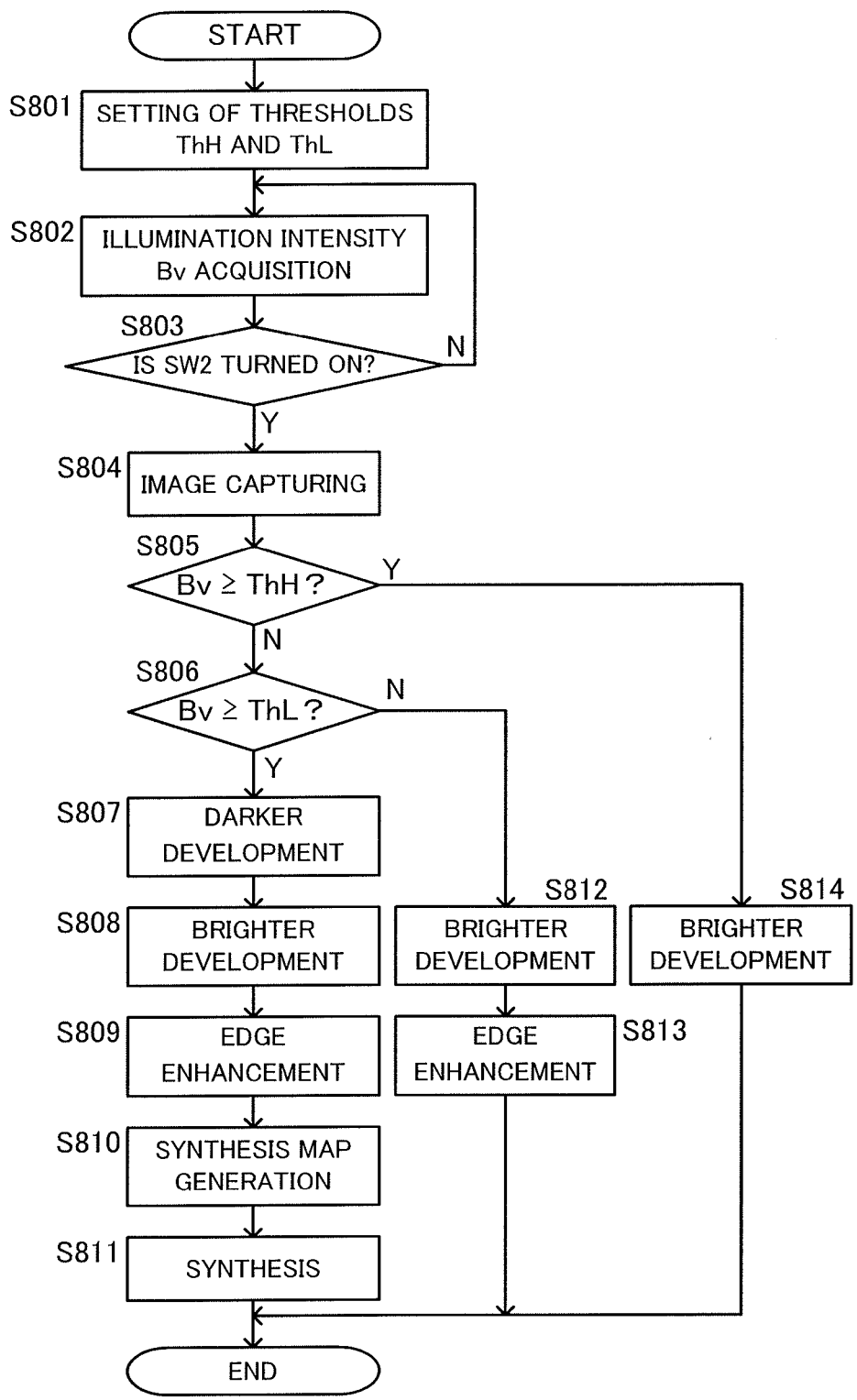
FIG. 8 is a flowchart of the operation of an image pickup apparatus in the third embodiment.

Subsequently, referring to FIG. 8, the operation of the image pickup apparatus 100 in the present embodiment will be described. FIG. 8 is a flowchart of the operation of the image pickup apparatus 100. Each step in FIG. 8 is performed by the image processing circuit 20 mainly based on a command (instruction) from the system control circuit 50.

When the image pickup apparatus 100 is turned on, first at step S801, the system control circuit 50 sets two thresholds of a higher threshold ThH and a lower threshold ThL as thresholds of an illumination intensity Bv. Subsequently at step S802, the system control circuit 50 (image processing circuit 20) acquires the illumination intensity Bv under image capturing conditions at live image display prior to image capturing. Then, at step S803, the system control circuit 50 determines whether the second shutter switch 64

(SW2) is turned on. When the switch SW2 is not turned on, at step S802, the system control circuit 50 repeats acquisition of the illumination intensity Bv to update the illumination intensity Bv in a constant period.

On the other hand, when the switch SW2 is turned on, at step S804, the system control circuit 50 starts an image capturing operation and acquires the CRW image 201. Subsequently at step S805, the system control circuit 50 compares the illumination intensity Bv to the higher threshold ThH (second threshold). When the illumination intensity Bv is smaller than the threshold ThH, the flow proceeds to step S806. On the other hand, when the illumination intensity Bv is equal to or larger than the threshold ThH, the flow proceeds to step S814.

At step S806, the system control circuit 50 compares the illumination intensity Bv (the brightness of the third image) to the lower threshold ThL (first threshold). When the illumination intensity Bv is smaller than the threshold ThL (the illumination intensity Bv is smaller than the first threshold), the flow proceeds to step S812. On the other hand, when the illumination intensity Bv is equal to or larger than the threshold ThL (the illumination intensity Bv is equal to or larger than the first threshold), the flow proceeds to step S807. At step S807, the developing circuit 202 of the image processing circuit 20 generates the darker image 203 by developing the acquired CRW image 201 darker. At step S808, the developing circuit 202 generates the brighter image 204 by developing the CRW image 201 brighter.

Subsequently at step S809, the filter circuit 205 generates the brighter image 206 by performing an edge enhancement on the brighter image 204. At step S810, the binarization circuit 207 generates the synthesis map 208 by binarizing the darker image 203 based on a certain luminance value as a threshold. Then, at step S811, the synthesizing circuit 209 synthesizes the darker image 203 and the edge-enhanced brighter image 206 based on the synthesis map 208.

When the illumination intensity Bv is smaller than the lower threshold ThL at step S806, the developing circuit 202 generates the brighter image 204 by developing the CRW image 201 brighter at step S812. Then, at step S813, the filter circuit 205 performs an edge enhancement on the brighter image 204. When the illumination intensity Bv is equal to or larger than the higher threshold ThH at step S805, the developing circuit 202 generates the brighter image 204 by developing the CRW image 201 brighter.

As described above, in the present embodiment, when the illumination intensity Bv is equal to or larger than the first threshold (Bv≥ThL), the system control circuit 50 controls the filter circuit 205 and the synthesizing circuit 209 to perform an edge enhancement and generate the synthetic image (step S807 to S811). When the illumination intensity Bv is smaller than the first threshold (Bv<ThL), the system control circuit 50 preferably controls the filter circuit 205 and the synthesizing circuit 209 to output the edge-enhanced second image without generating the synthetic image (steps S812 and S813). When the illumination intensity Bv is equal to or larger than the second threshold larger than the first threshold (Bv≥ThH), the system control circuit 50 more preferably outputs the second image without performing an edge enhancement or generating the synthetic image (step S814).

As described above, in the present embodiment, the synthetic image is generated by developing a shot image into images having a plurality of brightnesses and using each of the images predominantly in a region whose brightness corresponds to the image, thereby acquiring a desired image even for a scene including a plurality of objects having different brightnesses. In addition, the use of a brighter developed and edge-enhanced image in a darker region in the angle of view assuming a starry sky can obtain the synthetic image with the brightnesses of stars emphasized. Since an image capturing method and a recording method are controlled depending on the brightness of a scene, an edge enhancement and an anti-overexposure technique are likely to cause degradation for a shot scene such as the daytime having a high illumination intensity. Therefore, such degradation can be made less apparent by not performing the edge enhancement and the anti-overexposure technique.

Fourth Embodiment

Next, an image processing circuit in the fourth embodiment will be described. The general configuration of the image processing circuit in the present embodiment is the same of that of the image processing circuit 20a in the second embodiment described referring to FIGS. 4A to 4D, and thus a description thereof will be omitted.

Figure 9A:
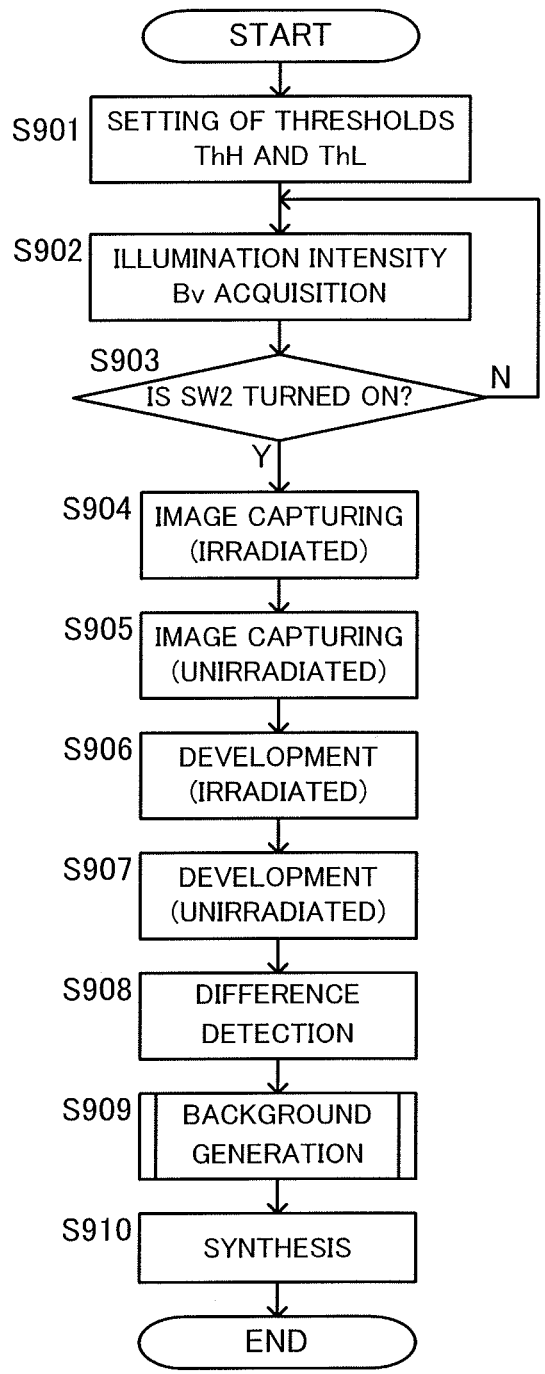
FIGS. 9A and 9B are flowcharts of the operation of an image pickup apparatus in the fourth embodiment.
Figure 9B:
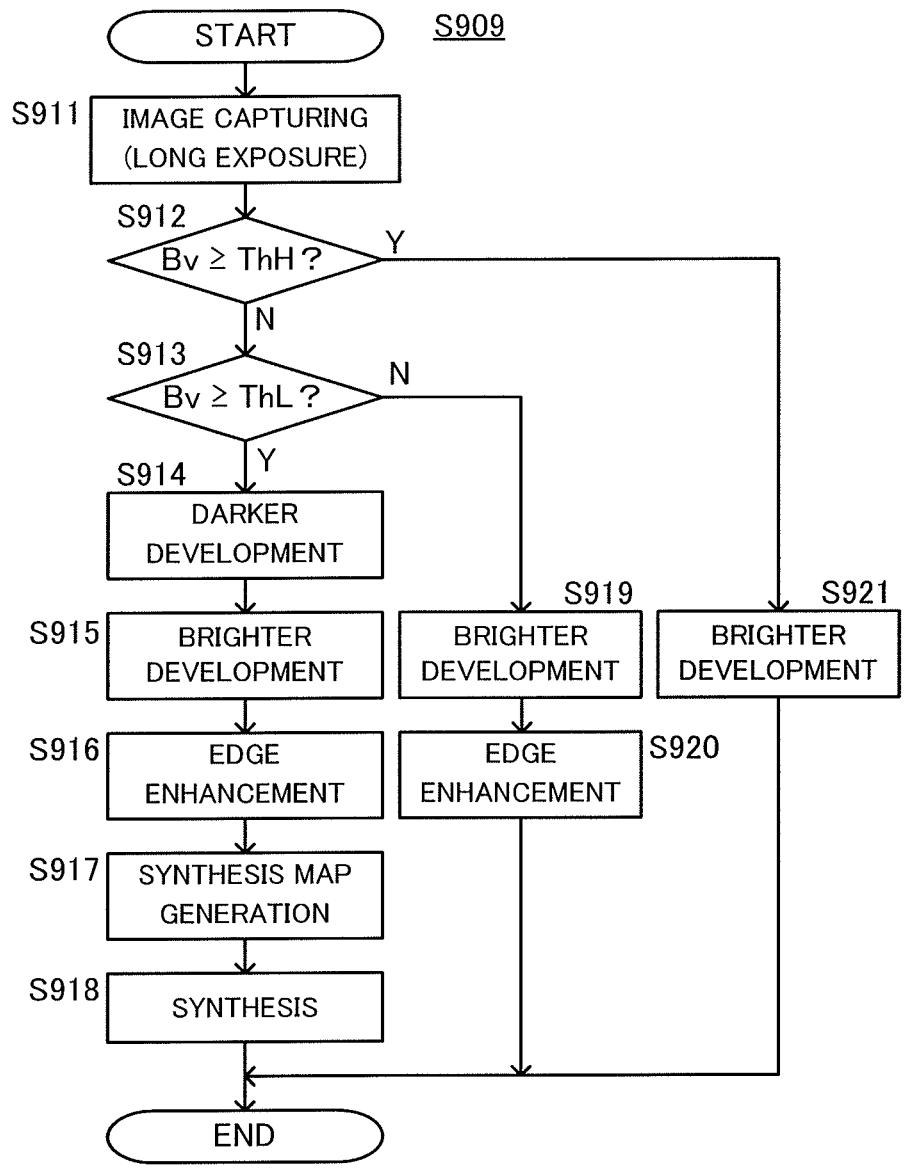

Subsequently, referring to FIGS. 9A and 9B, the operation of the image pickup apparatus 100 in the present embodiment will be described. FIGS. 9A and 9B are flowcharts of the operation of the image pickup apparatus 100. Each step in FIGS. 9A and 9B is performed by the image processing circuit 20a mainly based on a command (instruction) from the system control circuit 50.

When the image pickup apparatus 100 is turned on, first at step S901, the system control circuit 50 sets two thresholds of the higher threshold ThH and the lower threshold ThL as thresholds of the illumination intensity Bv. Subsequently at step S902, the system control circuit 50 (image processing circuit 20a) acquires the illumination intensity Bv under image capturing conditions at live image display prior to image capturing. Then, at step S903, the system control circuit 50 determines whether the second shutter switch 64 (SW2) is turned on. When the switch SW2 is not turned on, the system control circuit 50 repeats acquisition of the illumination intensity Bv at step S902 to update the illumination intensity Bv in a constant period.

On the other hand, when the switch SW2 is turned on, at step S904, the image processing circuit 20a starts an image capturing operation and acquires an image (the CRW image 411) captured by flashing the strobe. Then, at step S905, the image processing circuit 20a acquires an image (the CRW image 412) captured without flashing the strobe.

Subsequently at step S906, the developing circuit 413 generates the YUV image 414 by developing the CRW image 411 (image captured by flashing the strobe). Then, at step S907, the developing circuit 415 generates the YUV image 416 by developing the CRW image 412 (image captured without flashing the strobe). Subsequently at step S908, the difference detection circuit 417 detects the difference between the YUV image 414 generated at step S906 and the YUV image 416 generated at step S907 and generates the strobe irradiation map 418.

Subsequently at step S909, the image processing circuit 20a generates the background image (YUV image 410) based on another captured image. The details of step S909 will be described later. Then, at step S910, the synthesizing circuit 419 synthesizes the YUV image 414 (image obtained by flashing the strobe) and the YUV image 410 (the background image) based on the strobe irradiation map 418 generated at step S908.

Next, referring to FIG. 9B, the generation of the background image (step S909) will be described in detail. FIG.

93 is a flowchart of the generation of the background image (step S909). First at step S911, the image processing circuit 20a acquires the CRW image 401 by (long-exposure) image capturing. Subsequently at step S912, the system control circuit 50 compares the illumination intensity Bv to the higher threshold ThH. When the illumination intensity Bv is smaller than the threshold ThH, the flow proceeds to step S913. On the other hand, when the illumination intensity Bv is equal to or larger than the threshold ThH, the flow proceeds to step S921.

At step S913, the system control circuit 50 compares the illumination intensity Bv to the lower threshold ThL. When the illumination intensity Bv is smaller than the threshold ThL, the flow proceeds to step S919. On the other hand, when the illumination intensity Bv is equal to or larger than the threshold ThL, the flow proceeds to step S914. At step S914, the developing circuit 402 of the image processing circuit 20a generates the darker image 403 by developing the acquired CRW image 401 darker. At step S915, the developing circuit 402 generates the brighter image 404 by developing the CRW image 401 brighter.

Subsequently at step S916, the filter circuit 405 generates the brighter image 406 by performing an edge enhancement on the brighter image 404. At step S917, the binarization circuit 407 generates the synthesis map 408 by binarizing the darker image 403 based on a certain luminance value as a threshold. Then, at step S918, the synthesizing circuit 409 synthesizes the darker image 403 and the edge-enhanced brighter image 406 based on the synthesis map 408.

When the illumination intensity Bv is smaller than the lower threshold ThL at step S913, the developing circuit 402 generates the brighter image 404 by developing the CRW image 401 brighter at step S919. Then, at step S920, the filter circuit 405 performs an edge enhancement on the brighter image 404. When the illumination intensity Bv is equal to or larger than the higher threshold ThH at step S912, the developing circuit 402 generates the brighter image 404 by developing the CRW image 401 brighter at step S921.

In the description of the present embodiment, the irradiated image, the unirradiated image, and the background image are captured in this order, but are not limited to this order and may be captured in an optional order. In addition, in the description of the present embodiment, the image capturing and development of the irradiated and unirradiated images, and the image capturing, development, and synthesis of the background image are processed in this order, but are not limited to this order and may be processed in an optional order. Furthermore, in the description of the present embodiment, the image capturing is performed three times, but is not limited thereto. In the present embodiment, the flow is branched after image capturing depending on the relation between the illumination intensity Bv and the thresholds, but is not limited to this configuration. The flow may be branched prior to image capturing depending on the relation between the illumination intensity Bv and the thresholds. This configuration further reduces the number of images to be captured.

The third and the fourth embodiments allow, for a shot scene such as a city night scene having a middle illumination intensity, stars to be enhanced in an image of the scene by setting an exposure appropriate for a sky with the stars, and the edge enhancement of a bright object such as a building to be prevented and the overexposure thereof to be reduced. In addition, for a shot scene such as a countryside night scene having a low illumination intensity, stars are enhanced in an image of the scene by setting an exposure appropriate for a sky with the stars, whereas degradation due to the star enhancement can be less apparent because low-contrast objects such as a mountain and trees included in the same image are unlikely to be edge-enhanced. Since an image capturing method and a recording method are controlled depending on the brightness of a scene, an edge enhancement and an anti-overexposure technique are likely to cause degradation for a shot scene such as the daytime having a high illumination intensity. Therefore, such degradation can be made less apparent by not performing the edge enhancement and the anti-overexposure technique.

As described above, in each of the embodiments, the acquiring unit (developing circuits 202 and 402) of the image processing apparatus (image processing circuits 20 and 20a) acquires the image signal (CRW images 201 and 401). The generating unit (developing circuit 202 and 402) generates a first image (for example, the darker image 203 or 403) and a second image (for example, the brighter image 204 or 404) by performing enhancement processing on the image signal. The synthesizing unit (synthesizing circuits 209 and 409) generates the synthetic image with the first image used in a region (the first region or the higher luminance region) having a first brightness, and the second image used in a region (the second region or the lower luminance region) having a second brightness lower than the first brightness. A recording unit (the memory control circuit 22) records the synthetic image signal on the recording medium (memory 30). The generating unit performs the enhancement processing such that the second image is more enhanced than the first image. Specifically, the enhancement processing is performed on both of the first image and the second image, or the enhancement processing is performed not on the first image but only on the second image. The first image and the second image are not limited to images having different brightness from each other, but both images may have the same brightness, for example.

The image processing apparatus preferably includes a detecting unit (system control circuit 50) configured to detect the brightness of the image signal. When the brightness detected by the detecting unit is a third brightness ("Y" at step S805), the recording unit records an image signal corresponding to the first image (brighter image not edge-enhanced) on the recording medium (step S814). On the other hand, when the brightness detected by the detecting unit is a fourth brightness lower than the third brightness ("Y" at step S806), the recording unit records an image signal corresponding to the synthetic image on the recording medium (steps S807 to S811). More preferably, when the brightness detected by the detecting unit is a fifth brightness lower than the fourth brightness ("N" at step S806), the recording unit records an image signal corresponding to the second image (edge enhanced brighter image) on the recording medium (step S812 and S813).

The generating unit preferably generates the first image by developing an image signal relatively dark and generates the second image by developing the image signal relatively bright. The synthesizing unit more preferably generates the synthetic image based on the brightness of the first image. The generating unit more preferably develops the image signal differently by performing different gamma processing on the image signal. Furthermore, the generating unit preferably develops the image signal differently by applying different digital gains on the image signal.

Each of the embodiments provides an image processing apparatus, an image pickup apparatus, a method of controlling the image processing apparatus, and a non-transitory computer-readable storage medium that are capable of acquiring a desired image even for a scene including a plurality of objects having different brightnesses.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-171459, filed on Aug. 21, 2013, which is hereby incorporated by reference herein in its entirety.

What is claimed is:

1. An image processing apparatus comprising:
one or more processors; and
a memory storing a program which, when executed by the processors, causes the image processing apparatus to function as:
an acquiring unit configured to acquire an image signal;
a generating unit configured to perform enhancement processing on the image signal to generate a first image and a second image;
a detecting unit configured to detect a brightness of the image signal;
a synthesizing unit configured to generate a synthetic image with the first image used in a region having a first brightness and the second image used in a region having a second brightness lower than the first brightness; and
a recording unit configured to record the synthetic image on a recording medium,
wherein the generating unit is configured to perform the enhancement processing such that the second image is more enhanced than the first image, and
wherein:
the recording unit is configured to record an image signal corresponding to the second image on the recording medium in a case where a brightness detected by the detecting unit is a third brightness, and
the recording unit is configured to record an image signal corresponding to the synthetic image on the recording medium in a case where a brightness detected by the detecting unit is a fourth brightness lower than the third brightness.

2. The image processing apparatus according to claim 1, wherein the recording unit is configured to record an image signal corresponding to the second image on the recording medium when a brightness detected by the detecting unit is a fifth brightness lower than the fourth brightness.

3. The image processing apparatus according to claim 1, wherein the generating unit is configured to generate the first image by developing the image signal relatively dark and generate the second image by developing the image signal relatively bright.

4. The image processing apparatus according to claim 2, wherein the synthesizing unit is configured to generate the synthetic image based on a brightness of the first image.

5. The image processing apparatus according to claim 2, wherein the generating unit is configured to develop the image signal differently by performing different gamma processing on the image signal.

6. The image processing apparatus according to claim 3, wherein the generating unit is configured to develop the image signal differently by applying different digital gains to the image signal.

7. The image processing apparatus according to claim 1, wherein the generating unit is configured to:
generate a third image captured while a light emitting unit configured to irradiate an object with light is emitting light, and
generate a fourth image captured while the light emitting unit is not emitting light, and
the synthesizing unit is configured to synthesize the third image and the synthetic image based on a difference between the third image and the fourth image to generate a second synthetic.

8. The image processing apparatus according to claim 7, further comprising a control unit configured to control the generating unit and the synthesizing unit to perform the enhancement processing and to generate the synthetic image when a brightness of the third image is not lower than a first threshold.

9. The image processing apparatus according to claim 8, wherein the control unit is configured to control the generating unit and the synthesizing unit to output the second image on which the enhancement processing is performed without generating the synthetic image, when the brightness of the third image is lower than the first threshold.

10. The image processing apparatus according to claim 8, wherein the control unit is configured to control the generating unit and the synthesizing unit to output the second image without performing the enhancement processing and generating the synthetic image when the brightness of the third image is not lower than a second threshold that is larger than the first threshold.

11. The image processing apparatus according to claim 1, wherein the synthesizing unit is configured to generate the synthetic image when a shot scene is determined to be a night scene.

12. The image processing apparatus according to claim 1, wherein the synthesizing unit is configured to generate the synthetic image when an image capturing mode is set to a night scene mode.

13. The image processing apparatus according to claim 1, wherein the first image and the second image are generated from one shot image or from a plurality of shot images captured at exposures different from each other.

14. An image pickup apparatus comprising:

an image pickup element configured to photoelectrically convert an optical image to output an image signal;

one or more processors; and a memory storing a program which, when executed by the processors, causes the image processing apparatus to function as:

an acquiring unit configured to acquire the image signal;

a generating unit configured to perform enhancement processing on the image signal to generate a first image and a second image;

a detecting unit configured to detect a brightness of the image signal;

a synthesizing unit configured to generate the synthetic image with the first image used in a region having a first brightness and the second image used in a region having a second brightness lower than the first brightness; and a recording unit configured to record the synthetic image on the recording medium, wherein the generating unit is configured to perform the enhancement processing such that the second image is more enhanced than the first image, and wherein:

the recording unit is configured to record an image signal corresponding to the second image on the recording medium in a case where a brightness detected by the detecting unit is a third brightness, and the recording unit is configured to record an image signal corresponding to the synthetic image on the recording medium in a case where a brightness detected by the detecting unit is a fourth brightness lower than the third brightness.

15. A method of controlling an image processing apparatus, the method comprising the steps of:

acquiring an image signal;

performing enhancement processing on the image signal to generate a first image and a second image;

detecting a brightness of the image signal;

generating the synthetic image with the first image used in a region having a first brightness and the second image used in a region having a second brightness lower than the first brightness; and recording the synthetic image, wherein the enhancement processing is performed such that the second image is more enhanced than the first image, and wherein:

an image signal corresponding to the second image is recorded in a case where a brightness detected by the detecting step is a third brightness, and an image signal corresponding to the synthetic image is recorded in a case where a brightness detected by the detecting step is a fourth brightness lower than the third brightness.

16. A non-transitory computer-readable storage medium that stores a program configured to cause a computer to execute a process, the process comprising:

acquiring an image signal;

performing enhancement processing on the image signal to generate a first image and a second image;

detecting a brightness of the image signal;

generating a synthetic image with the first image used in a region having a first brightness and the second image used in a region having a second brightness lower than the first brightness; and recording the synthetic image, wherein the enhancement processing is performed such that the second image is more enhanced than the first image, and wherein:

an image signal corresponding to the second image is recorded in a case where a brightness detected by the detecting step is a third brightness, and an image signal corresponding to the synthetic image is recorded in a case where a brightness detected by the detecting step is a fourth brightness lower than the third brightness.

* * * * *